H. B. SEELY.
CULINARY UTENSIL.
APPLICATION FILED OCT. 15, 1906.
909,238. Patented Jan. 12, 1909.
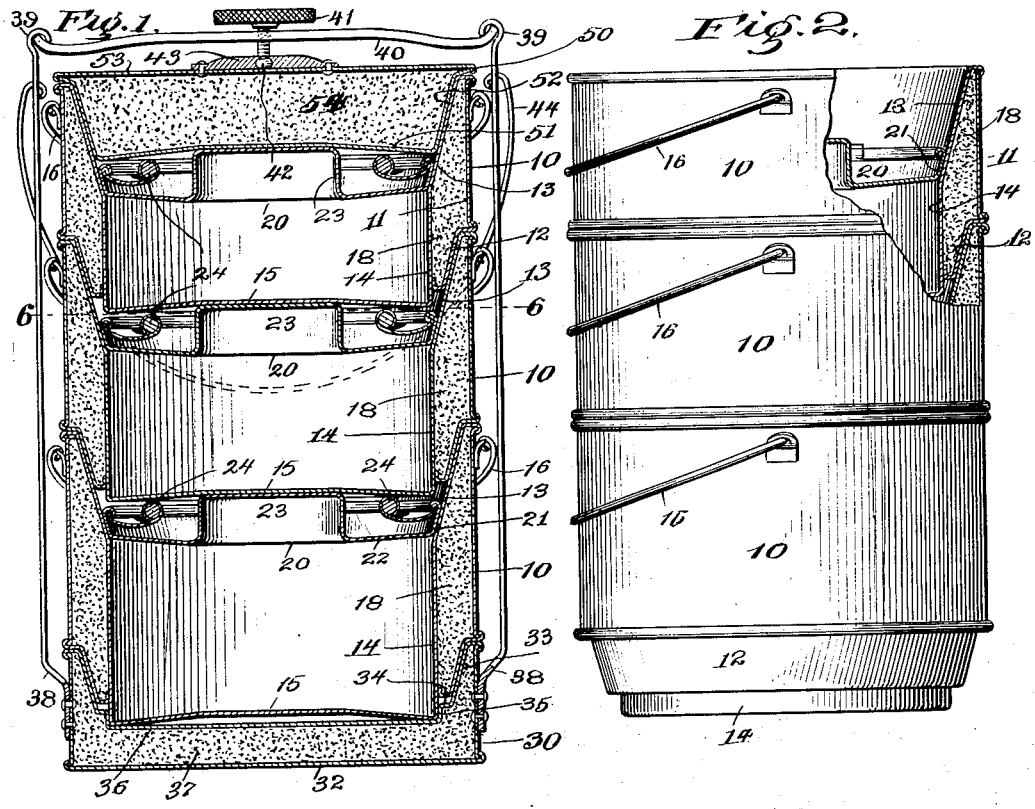
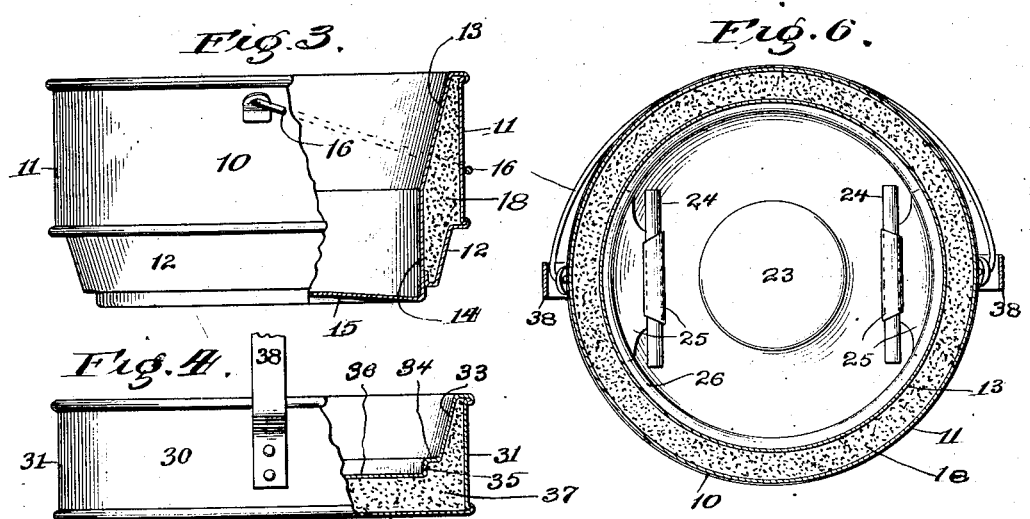

UNITED STATES PATENT OFFICE.

HERMAN B. SEELY, OF CHICAGO, ILLINOIS.

CULINARY UTENSIL.

No. 909,838.

Specification of Letters Patent.

Patented Jan. 12, 1909.

Application filed October 15, 1906. Serial No. 338,888.

*To all whom it may concern:*

Be it known that I, HERMAN B. SEELY, a citizen of the United States, residing at Chicago, in the county of Cook and State of Illinois, have invented certain new and useful Improvements in Culinary Utensils, of which the following is a full, clear, and exact description.

My invention relates to certain new and useful improvements in culinary utensils and more particularly to improvements in utensils which are employed for the purpose of insulating the commodity contained therein from the effects of the heat or cold surrounding the same, whereby after said commodity has been boiled, or heated up to a certain degree, or the commodity has been frozen or cooled, the temperature of the commodity may be retained at or near such temperature for a considerable length of time. Many attempts have been made to accomplish this, as, for instance, receptacles filled with hay or other heat non-conducting substances have been used in which the kettles or other utensils are placed and covered up, after the material has been boiled a certain length of time, but this is a cumbersome and inconvenient method, although it has been found practicable so far as the retaining of the heat is concerned.

It is my aim to devise a utensil in which one commodity, or several, if desired, may be boiled, warmed or frozen, after which a top and bottom portion may be applied thereto, thereby converting it into what might be termed a "fireless cooker" that is a receptacle completely surrounded with a non-combustible, non-conductor of heat. This I accomplish by providing a connected non-conductor of heat around the sides of the receptacle, and removable top and bottom heat non conductors on the ends which may be readily applied to or removed from the receptacles.

Another object is to provide a utensil of this character, made up of a number of separate and disjointed compartments which nest one into the other, so that all may be used together, or one used alone for the purpose for which the utensil has been designed, or any one of the receptacles may be used as an ordinary cooking utensil.

To such end my invention consists of certain novel features of construction and arrangement, a description of which will be found in the following specification, and the essential features of which will be definitely pointed out in the claims.

In the drawings Figure 1 is a vertical diametrical section through a device embodying my invention. Fig. 2 is a side view with the top and bottom removed, a part being broken out to show the interior thereof. Fig. 3 is a side view of one of the receptacles with a portion broken away to show the interior. Fig. 4 is a similar view of the bottom. Fig. 5 is a similar view of one of the receptacle covers, and Fig. 6 is a horizontal section taken on the line 6—6 of Fig. 1.

As shown in the drawings the device contains a plurality of sections or receptacles 10 preferably of different depths, but all having the same general contour and arrangement so that one will nest or fit into the top of the other. Inasmuch as all the receptacles are substantially alike, a description of one will be sufficient.

Referring to Fig. 3 which shows the topmost receptacle, 11 represents a cylindrical wall to which is secured a downwardly converging or tapered portion 12 and an outwardly flaring inner portion 13, the portion 13 terminating in a circular wall 14, which is formed with a bottom 15. The tapered portion 12 of the surrounding wall is also secured to the wall 14 in any suitable manner, and the annular space between the inner and outer walls is filled with a suitable non-combustible, heat non-conducting material 18, such as magnesia, asbestos or the like. A bail 16 is secured to the receptacle which furnishes means by which it may be handled or supported. The receptacle covers 20 are all constructed alike and as shown in Fig. 5, each contains a tapered flange 21 that is adapted to fit snugly against the tapered inner wall 13 of the receptacles. Said flange extends up from the bottom 22 of the cover, and a central dome 23 is preferably formed in the bottom 22 of the cover which dome is engaged by the receptacle above it in nesting the parts, to crowd the cover snugly down upon its seat in the receptacle. Handles 24 are secured to each cover as shown in Figs. 1 and 6 by means of clips 25 that surround the handles and are inserted in a seam 26 which is formed upon the upper end of the flange 21. These handles furnish a convenient means of handling the cover.

The receptacles obviously may be used separately whenever one is cooking commodities that require about the same amount of cooking, but when it is unnecessary to boil one commodity as long as the other the receptacles can be nested together, as shown in Fig. 2, whereupon a longer time will be consumed to transfer the heat to the upper receptacle than to the lower, so that when the commodity in the lowest receptacle has been boiled a sufficient length of time the commodity in the uppermost receptacle will also have been boiled approximately the proper length of time. The receptacles being surrounded by a non-conductor of heat, are practically protected against the effects of heat and cold on the sides, but it now becomes necessary to completely surround the receptacles with a non-conductor of heat and for this reason I have provided a top and bottom which may be attached to the other parts when the receptacles are removed from the fire. As shown in Fig. 4 the bottom 30 consists preferably of a circular inclosing wall 31 which has a bottom 32 and a tapered inner wall 33 secured thereto. The inner wall is shouldered at 34 to form a horizontal ledge from which projects a downward extension 35 that terminates in a false bottom 36. The space between the walls and bottoms is filled with an insulating material 37 preferably of the same character as that contained between the walls of the receptacles 10.

Two connecting bars 38 are secured to the bottom 30 and extend upward to a point immediately above the uppermost receptacle where they terminate in hooks 39 that are engaged by a cross bar 40 which is threaded upon a clamping screw 41. The clamping screw 41 is provided with a head 42 that is seated in a bearing 43 secured upon the top 50. A bail 44 is secured upon the connecting bars 38 and affords a convenient means for transporting the entire device. The removable top 50 comprises a bottom portion 51, a tapered or flaring inclosing wall 52 and a top portion 53 secured to the inclosing wall 52 in any suitable manner. The cover is filled with a heat non-conductor 54 preferably of the same substance as the filling 18 or 37. The flaring or tapered walls of all of the receptacles, covers, top and bottom, are of the same pitch so that the covers will fit any of the receptacles, and the top will fit any of the receptacles and any of the receptacles will fit in the bottom 30. In other words all of the parts are interchangeable so that the position of either of the receptacles with respect to the other is immaterial.

It is to be understood that inasmuch as all of the receptacles are alike in form, with the exception of their depth, that the top 50 will fit any one of the receptacles, and that the bottom 30 will likewise fit any one of the receptacles, and consequently, that when any one of them is to be used to the exclusion of the others, then the top and bottom are placed upon said receptacle. It is also obvious that the device may be made and sold with either one or more receptacles as desired, and that in place of several shallow receptacles one large one may be used.

It should be noticed that the lower portions of the flaring sides 12 do not terminate in sharp edges, but the lower ends are rather raised above the lower end for the reason that a thin edge close to the fire would be endangered when subjected to the influence of a high degree of heat.

In the use of my device when all of the receptacles are used, the top and bottom are removed, the receptacles filled with the commodities and set on the fire. As soon as the commodities have been boiled a sufficient length of time they are removed from the fire, the top and bottom attached, thereby completely surrounding the contents with a heat insulator. In clamping the top and bottom in place it should be noticed that all of the receptacles will be crowded together, thereby leaving no space for heat or cold to enter and that the covers for each receptacle will also be crowded down upon its receptacle, further removing the contents from the effects of heat or cold. When the parts are together as shown in Fig. 1 there is a complete heat insulating jacket surrounding the inner wall. This provides a device which can be used for ordinary cooking purposes and which can be converted into what may be called a fireless cooker, by merely adding the top and bottom portions. The commodities when surrounded by the heat insulator will retain their temperature for a considerable period of time so that it is necessary only to cook them for a short time.

I realize that various alterations and modifications of the device are possible, and I do not, therefore, desire to limit myself as specifically pointed out in the appended claims.

I claim as new and desire to secure by Letters Patent:

1. In a device of the class described, the combination of a plurality of nestable receptacles, each of which is provided with a separate jacket upon its side wall, a jacketed top, and a jacketed bottom for the nested receptacles.

2. In a device of the class described, the combination of a plurality of nestable receptacles, each of which is provided with a separate jacket upon its side wall, a removable jacketed top, and a removable jacketed bottom for the nested receptacles, and means for clamping the top and bottom thereto.

3. In a device of the class described, the combination of a plurality of nestable receptacles, each of which is provided with a separate jacket upon its side wall, a removable jacketed top, and a removable jacketed bottom for the nested receptacles, a pair of connecting bars secured to the bottom, a cross-bar engaging the upper ends of said connecting bars, and a clamping screw threaded in the cross-bar and engaging said top.

4. In a device of the class described, the combination of a vessel, the bottom of which is exposed, a jacket surrounding the side wall of said vessel, a jacketed top section, and a jacketed bottom section removably secured to said vessel.

5. In a device of the class described, the combination of a vessel, the bottom of which is exposed, a jacket surrounding the side wall of said vessel, a jacketed top section, and a jacketed bottom section removably secured to said vessel, and means for clamping the vessel between the top and bottom sections.

6. In a device of the class described, the combination of a vessel having an exposed bottom, an open, outwardly flaring, upper end, an outer inclosing wall secured to the upper end of the flaring portion, the lower portion of said inclosing wall terminating in a downwardly converging portion, and insulating material in the annular space between the vessel and inclosing wall, a heat insulated top fitting in the open flaring portion of the vessel, and a heat insulated bottom fitting over the converging lower portion of the vessel.

7. In a device of the class described, the combination of a vessel having an exposed bottom, an open, outwardly flaring, upper end, an outer inclosing wall secured to the upper end of the flaring portion, the lower portion of said inclosing wall terminating in a downwardly converging portion, a heat insulating material in the annular space between the vessel and inclosing wall, a heat insulated top fitting in the open flaring portion of the vessel, a heat insulated bottom fitting over the converging lower portion of the vessel, and means for clamping the vessel between the top and bottom.

8. In a device of the class described, the combination of a jacketed vessel, having an open flaring upper end and a downwardly converging lower end, a cover fitting upon the open flaring upper end, a removable jacketed bottom fitted upon the lower converging end, a removable jacketed top fitting in the open flaring end above the cover, and means for clamping the vessel between the top and bottom.

9. In a device of the class described, the combination of a jacketed vessel, having an open flaring upper end and a downwardly converging lower end, a cover fitting upon the open flaring upper end and having an upwardly extending dome, a jacketed bottom fitting upon the converging lower end of the vessel, and a jacketed top fitting within the open flaring end of the vessel, and bearing against the dome of the cover, and means for crowding the top down upon the dome of the cover and crowding the side wall of the top upon the flaring upper end of the vessel.

10. In a device of the class described, the combination of a cooking vessel, an outer wall fixed thereto and surrounding the side wall thereof, a non-combustible, heat non-conducting material in the space between the vessel and the surrounding wall, a removable top containing a heat non-conducting material, and a removable bottom containing a heat non-conducting material.

HERMAN B. SEELY.

Witnesses:
  WM. P. BOND,
  CHAS. O. SHERVEY.